(12) United States Patent
Akkermann

(10) Patent No.: US 8,924,045 B2
(45) Date of Patent: Dec. 30, 2014

(54) DEVICE FOR ADJUSTING AND LOCKING A MOVABLE CONTROL SURFACE

(75) Inventor: Eldert Akkermann, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 80 days.

(21) Appl. No.: 13/529,887

(22) Filed: Jun. 21, 2012

(65) Prior Publication Data

US 2013/0000432 A1 Jan. 3, 2013

Related U.S. Application Data

(63) Continuation of application No. PCT/EP2010/069351, filed on Dec. 10, 2010.

(60) Provisional application No. 61/289,250, filed on Dec. 22, 2009.

(30) Foreign Application Priority Data

Dec. 22, 2009 (DE) .......................... 10 2009 059 950

(51) Int. Cl.
  *B64C 13/28* (2006.01)
  *G01M 9/08* (2006.01)
  *F16H 25/20* (2006.01)
  *B64C 3/58* (2006.01)
  *B64C 13/50* (2006.01)

(52) U.S. Cl.
  CPC ................. *G01M 9/08* (2013.01); *F16H 25/20* (2013.01); *B64C 3/58* (2013.01); *B64C 13/28* (2013.01); *B64C 13/50* (2013.01)
  USPC ............................................................ 701/3

(58) Field of Classification Search
  None
  See application file for complete search history.

(56) References Cited

U.S. PATENT DOCUMENTS 4,284,254 A * 8/1981 Rieben .......................... 244/99.2
(Continued)

FOREIGN PATENT DOCUMENTS

DE 10208258 A1 9/2003

OTHER PUBLICATIONS

International Searching Authority, International Search Report dated Mar. 4, 2011 for International Application No. PCT/EP2010/069351.

(Continued)

*Primary Examiner* — Redhwan K Mawari
*Assistant Examiner* — Edward Torchinsky
(74) *Attorney, Agent, or Firm* — Ingrassia Fisher & Lorenz, P.C.

(57) ABSTRACT

An apparatus is provided for adjusting and locking a movable control surface, which includes, but is not limited to a rotatably held spindle, an adjustment body, a linear guide, a drive unit, a linear positioning encoder and a control unit. The adjustment body with the linear guide is slidably guided along a first movement axis, and the spindle is connected to the adjustment body for moving the adjustment body along the movement axis. The adjustment body is configured to connect to a control surface mount, and the linear positioning encoder and the drive unit are connected to the control unit. The latter is designed to adjust a predetermined actuating position of the adjustment body by rotation of the spindle with the drive unit and by comparing an actual position, detected by the linear positioning encoder, of the adjustment body with the predetermined actuating position.

5 Claims, 4 Drawing Sheets

(56) References Cited

U.S. PATENT DOCUMENTS

| | | | |
|---|---|---|---|
| 4,682,494 A * | 7/1987 | Reed | 73/147 |
| 5,809,831 A | 9/1998 | Nagai et al. | |
| 6,158,295 A * | 12/2000 | Nielsen | 74/89.38 |
| 7,525,267 B2 * | 4/2009 | Angiuli et al. | 318/282 |
| 8,136,768 B2 | 3/2012 | Akkermann et al. | |
| 8,245,977 B2 * | 8/2012 | Binder | 244/131 |
| 2009/0255354 A1 * | 10/2009 | Akkermann | 74/89.33 |

OTHER PUBLICATIONS

Jensen, S. C. et al., "Flight Test Experience with an Electromechanical Actuator on the F-18 Systems Research Aircraft", 19th Digital Avionics Systems Conference, Oct. 7-13, 2000, Philadelphia, Pennsylvania.

The Bug. Ultra Motion Bug Application Information [online]. Ultramotion, 2012 [retrieved on Jun. 20, 2012]. Retrieved from Internet: <URL: www.ultramotion.com/products/bugApp.html>.

\* cited by examiner

DEVICE FOR ADJUSTING AND LOCKING A MOVABLE CONTROL SURFACE

CROSS-REFERENCE TO RELATED APPLICATIONS

This is a continuation of International Application No. PCT/EP2010/069351, filed Dec. 10, 2010, which application claims priority to U.S. Provisional Application No. 61/289,250, filed Dec. 22, 2009 and to German Application No. 10 2009 059 950.9, filed Dec. 22, 2009, which are hereby incorporated by reference in their entirety.

TECHNICAL FIELD

The technical field relates to an apparatus for adjusting and locking a movable control surface, to a control surface unit and to the use of an apparatus for adjusting and locking a movable control surface. The technical field also relates to an advantageous design of wind-tunnel aircraft models.

BACKGROUND

In a wind tunnel, for the purpose of determining aerodynamic parameters, aircraft models are used which are designed to reflect the prototype as accurately as possible and which, depending on the type and purpose of measuring, in measuring experiments can also comprise deflected control surfaces. Normally, for this purpose, control surfaces with deflection angles that are set so as to be fixed are used, which control surfaces need to be exchanged after every measuring process. This requires entering the wind tunnel, manually exchanging the control surfaces on the aircraft model, and subsequently carrying out the next measuring process. Because of the significant costs associated with operating the wind tunnel, in the case of extended measuring campaigns with many different control surface angles this is not a particularly advantageous solution.

Furthermore, it is known, in some cases, to use adjustment devices for moving control surfaces, which adjustment devices are arranged outside the aircraft model and, by way of rods, can move control surfaces in a remotely-controlled manner. Because of the possibility of influencing the airflow this is not particularly advantageous.

In DE 10 2008 003 543 A1 and in US 2009 0179109 A1 a system and method for adjusting and locking a control surface movably arranged on a wind-tunnel aircraft model is disclosed. The system comprises a drive arrangement for driving the control surface, and a locking arrangement. The control surface is movable by way of a connecting rod, and can be locked in a predetermined graduated position by means of a toothed locking arrangement. DE 10 2005 040 441 A1 shows a linear actuator, especially for remote control of adjustable components on wind tunnel models, having a housing, gear motor and a threaded spindle. The threaded spindle is connected to the gear motor with a chain drive. DE 102 08 258 A1 shows an apparatus for providing an adjustable flow profile, especially for a flow body positioned in a cryogenic surrounding, having a linear actuator and two coupled cranks, and DE 696 24 060 T2 shows an electric actuator having an actuator housing with a plurality of elongated wedges arranged in am axial direction.

In view of the foregoing, at least one object is to provide an apparatus for adjusting a control surface that supports as compact as possible a design for integration in an aircraft model, while at the same time making it possible to achieve precise, repeatable deflection of control surfaces in a non-incremental manner, which deflection remains the same even if subjected to an aerodynamic flow. In addition, other objects, desirable features and characteristics will become apparent from the subsequent summary and detailed description, and the appended claims, taken in conjunction with the accompanying drawings and this background.

SUMMARY

An apparatus is provided for adjusting and locking a movable control surface comprises at least one rotatably held spindle, at least one adjustment body, at least one linear guide, at least one drive unit, at least one linear positioning encoder and at least one control unit. The adjustment body with the linear guide is slidably guided along a first movement axis; the spindle is connected to the adjustment body for moving the adjustment body along the movement axis; the adjustment body is designed to be connected to a mount of a control surface; the linear positioning encoder and the drive unit are connected to the control unit; and the control unit is designed to adjust a predetermined actuating position of the adjustment body by rotation of the spindle with the drive unit and by comparing an actual position, detected by the linear positioning encoder, of the adjustment body with the predetermined actuating position.

The combination of the rotatably held spindle, the adjustment body and the linear guide allows infinitely variable linear movement, as is common in mechanical linear actuators. With the additional control unit, which by way of a signal connection or data connection can receive a value relating to a predetermined actuating position, a drive unit the spindle can be rotated so that the adjustment body is moved in the linear guide. As soon as the control unit, by way of the linear positioning encoder, detects the actual position that correlates to the predetermined actuating position, the drive unit is stopped so that the control surface, for example, remains in a predetermined angle position.

In order to achieve a very precise actuating position, whose accuracy essentially depends on the accuracy of the linear positioning encoder and on the play in the drive train, the control unit may achieve different adjustment speeds of the drive unit by way of suitable control of the drive unit. Shortly before reaching the predetermined actuating position the adjustment speed may be significantly reduced so that the inertia of the drive unit and of the adjustment body as well as of the driven control surface and of the components of the drive train is reduced, and the predetermined actuating position is finally reached at reduced speed. This may save readjustment by reverse rotation of the drive unit.

In the simplest case the drive unit can be a motor that may, for example, be designed as a brushless electric motor. Depending on the size and design of the electric motor, in order to reduce the rotary speed and in order to increase torque, it may be sensible to arrange a gear arrangement between the motor and the spindle. In order to achieve as compact a design unit as possible it makes sense to design the gear arrangement as a planetary gear arrangement that may be designed so as to be point-symmetrical to the longitudinal axis of the electric motor and that ideally is accommodated in a housing directly with the motor. This provides a space-saving design of the apparatus.

According to an embodiment, the spindle is designed so as to be self-locking and free of play. In this manner a hysteresis effect, which manifests itself in inaccurate positioning, may be avoidable. As a result of the self-locking design of the spindle, the adjusted position of the control surface can be maintained even if the control surface is subjected to loads during aerodynamic experiments, because mechanically coupling the control surface to the spindle does not make it possible for the spindle to rotate when a force acts on said spindle. In this context it should be mentioned that, of course, the connection between a control surface mount that is to be driven and the adjustment body should also be designed so as to be free of play, and consequently inaccurate positioning can be entirely avoided.

According to an embodiment, the adjustment body comprises a spindle nut with a spindle nut thread that corresponds to a spindle thread of the spindle and that comprises a recess that is suitable for receiving the spindle nut in a positive-locking and non-rotational manner by sliding in. Consequently the adjustment body can be produced separately from the spindle nut, and if required the spindle and the spindle nut can be exchanged very easily without there being any need to effect modifications on the entire apparatus.

According to an embodiment, the adjustment body comprises connecting means for connection to an adjustment lever. The use of a connection on the adjustment body supports direct coupling to a control surface mount. The adjustment lever can comprise a very slim design so that the apparatus can more easily be integrated in the aircraft model. The connection may, for example, be a suitably formed recess or a cutout on a delimitation edge for receiving the adjustment lever; at the same time it may also be an angle mount or the like. All the connections preferably define a hinge line around which the adjustment lever can be hinged. This hinge line preferably extends so as to be perpendicular to the movement axis of the adjustment body.

According to an embodiment of the apparatus, the linear guide has been implemented as a body with a movement-axis-symmetrical recess for guiding the adjustment body. By forming a body with such a recess, it is possible both to achieve a design of the apparatus, which design is as slender as desired, and at the same time also to achieve a very simple design. The adjustment body and the recess can be equipped with a corresponding sliding fit that makes it possible for the adjustment body to move to the greatest extent possible free of play.

According to an embodiment, the adjustment body is coupled to a limit switching device that is connected to the control unit. The limit switching device is designed, when an extreme position of the adjustment body is detected, to avoid an adjustment movement direction that would result in exceeding the corresponding extreme position by preventing movement in the corresponding adjustment movement direction. Overloading the drive unit and the adjustment lever can be prevented by avoiding hard mechanical end stops. Preventing continuous movement in a critical direction in terms of an extreme position reached nevertheless makes it possible to move back into a position opposite the blocked movement direction. The control unit would preferably be designed in such a manner that after the extreme position has been left, both movement directions are available again.

According to an embodiment, the apparatus comprises two limit switching devices that are designed as two photoelectric barriers that are spaced apart from each other. A connecting line between the two photoelectric barriers extends parallel to the movement axis. The adjustment body is coupled to a disrupting profile which when the adjustment body moves can be guided through the two photoelectric barriers. The use of photoelectric barriers and of a disrupting profile that can be moved into the photoelectric barriers avoids the use of micro switches or other mechanical design units whose function may be impaired with frequent use or with extended lack of use. The photoelectric barriers are not subject to wear, and thus provide a very favorable and reliable option of a limit switching device.

Furthermore, a control surface unit, in which the drive unit is arranged on the linear guide within which the spindle for moving the adjustment body extends, and furthermore comprises an adjustment lever and a control surface hingeably held on the linear guide, which control surface is arranged on the adjustment body by way of a control surface mount with the adjustment lever. The control surface unit forms a compact unit which viewed in isolation merely needs to be connected, by way of an electrical connection and a data connection, for example to a control desk, a terminal or the like, in order to adjust the control surface angle when required. Furthermore, the use of such an apparatus is provided for adjusting and locking a movable control surface on an aircraft model for a wind tunnel.

BRIEF DESCRIPTION OF THE DRAWINGS

Further characteristics, advantages and application options are disclosed in the following detailed description in conjunction with the figures. All the described and/or illustrated characteristics per se and in any combination form the embodiments, even irrespective of their composition. Furthermore, identical or similar objects in the figures have the same reference characters, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
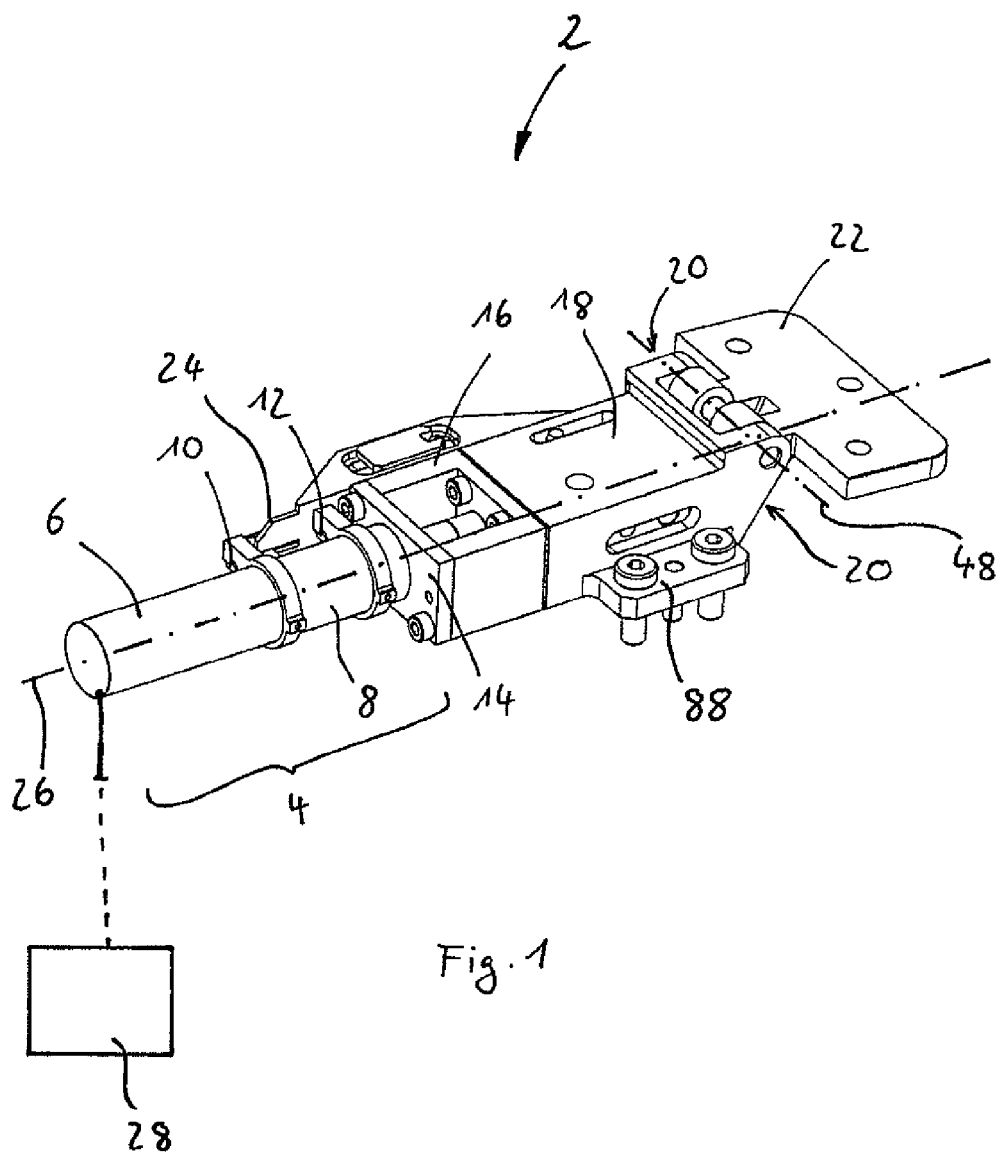
FIG. 1 shows an isometric view of the apparatus with a control surface arranged thereon.

FIG. 1 shows an isometric view of the apparatus 2, which apparatus 2 comprises a drive unit 4 with an electric motor 6, a gear arrangement 8 and two limit switching devices 10 and 12 arranged thereon. The electric motor 6 is arranged on a gear arrangement 8 that has the same external diameter, which gear arrangement 8 in turn is mounted on a cover 14 of a gear arrangement housing 16, with the aforesaid following on from a linear guide 18. The latter in turn comprises two connection 20 that are designed in the form of angle mounts formed in a single piece on the linear guide 18. At said location a hinge line 48 is formed with a control surface mount 22, on which hinge line 48 the control surface mount 22 is hingeably arranged.

In this illustration at least part of a disrupting profile 24 is shown, which disrupting profile 24 moves parallel to a movement axis 26 during hinging movement of the mount 22. Consequently, in the limit switching device 10 in an extreme position a contact or a signal is established so that a control unit 28 can detect this extreme position and can interrupt the drive of the motor 6 at least in one direction, towards the left-hand side in the plane of the illustration. When the other extreme position has been reached, at the right-hand side in the plane of the illustration, a contact or a signal with the other limit switching device 12 is established.

Figure 2:
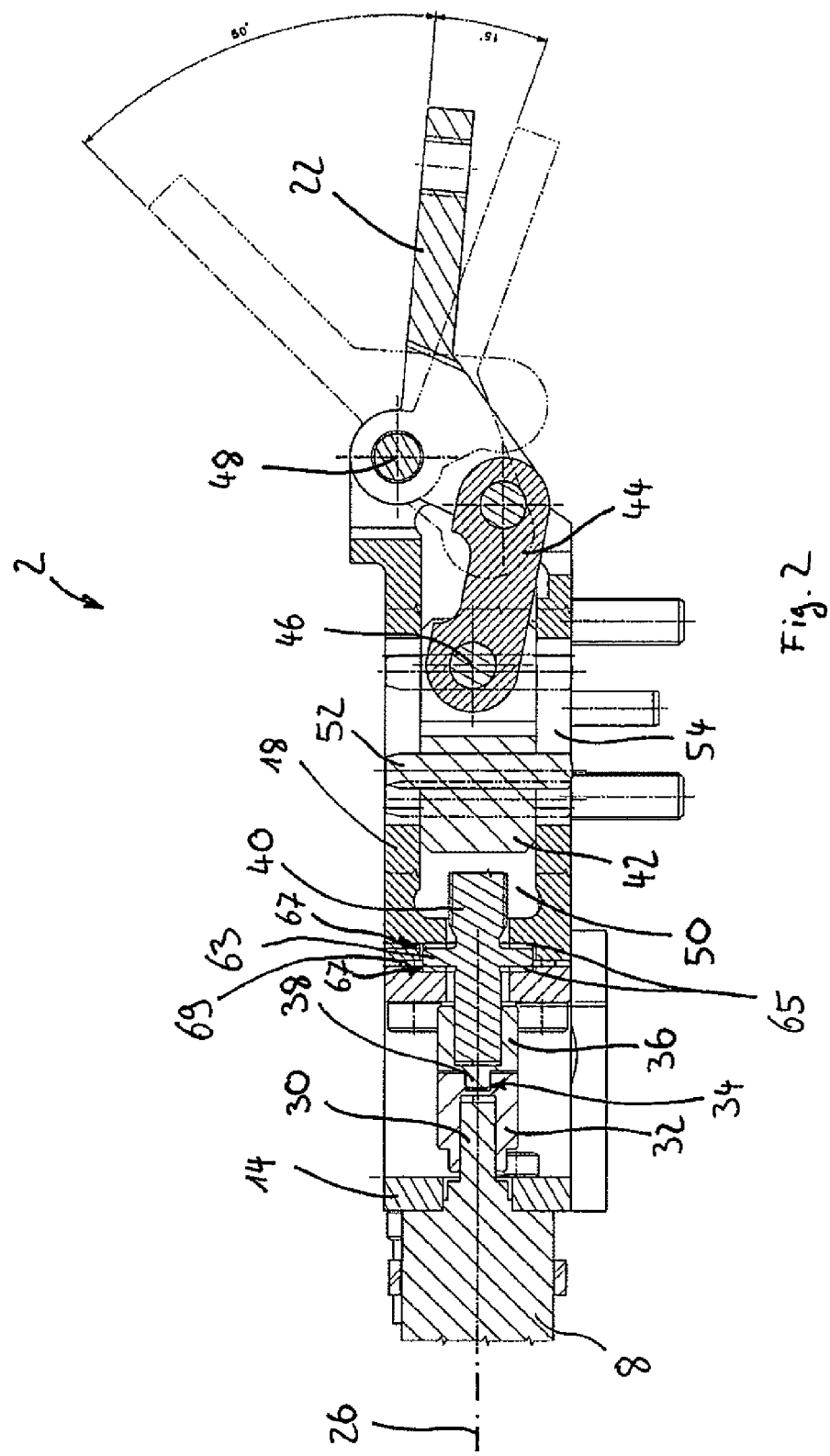
FIG. 2 shows a lateral section view of the apparatus with a control surface arranged thereon.

In FIG. 2 a lateral section view shows the interior design of the apparatus 2. A gear shaft 30 projects through the plate 14 into the gear arrangement housing 16 where it drives a bushing 32 connected to the gear shaft 30, which bushing 32 comprises a slot 34 at its side pointing away from the motor 6. A second bushing 36 comprises a correspondingly formed projection 38 that is designed to engage the slot 34 in a flush manner. The second bushing 36 in turn is connected to a spindle 40 that moves an adjustment body 42 by engaging a spindle nut (not shown in this illustration). On the adjustment body 42 an adjustment lever 44 is arranged so as to be hingeable on a hinge axis 46, with the side of the adjustment lever 44, which side faces away from the adjustment body 42, being hingeably connected to the control surface mount 22. As shown in FIG. 1, the control surface mount 22 is arranged so as to be hingeable on a hinge axis 48 formed on the linear guide 18.

For guiding, the adjustment body 42 is formed in such a manner that it can be moved flush in a recess 50 of the linear guide 18. To prevent movement extending laterally to the movement axis, as an example a pin 52 may be inserted into the adjustment body 42 after placement in the recess 50, which pin 52 is guided in a corresponding slot 54 on the top or bottom of the linear guide 18. The combination of a pin 52 and slots 54 furthermore defines a mechanical end stop, which in the case of defective or ineffectively-switched limit switching devices 10 and 12 by means of a hard mechanical end stop would prevent the control surface mount 22 from continuing to move.

Figure 3:
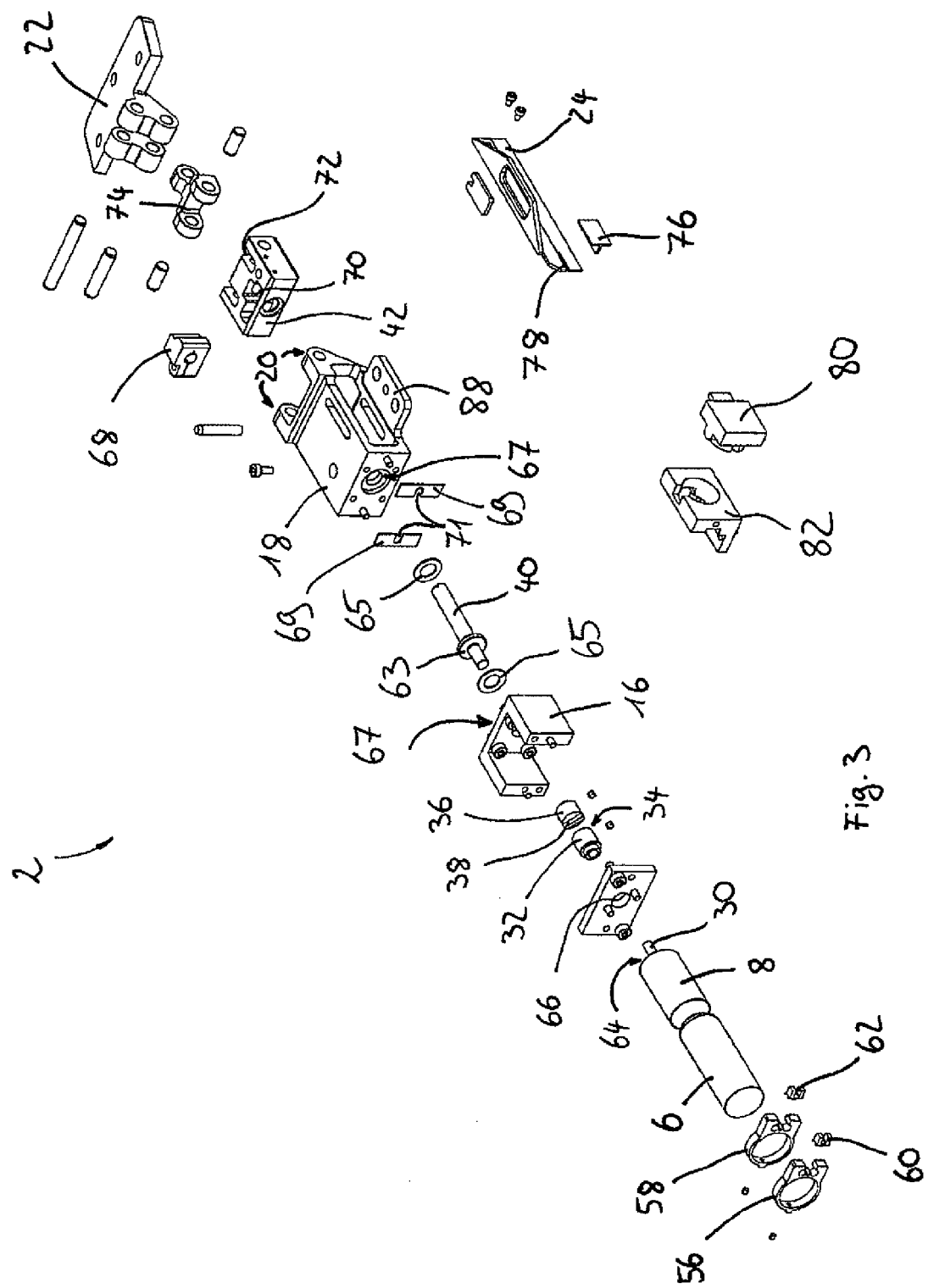
FIG. 3 shows an exploded view of the apparatus.

In the exploded view of FIG. 3, as an example, all the components of the apparatus 2 are shown in detail. A combination of the motor 6 and the gear arrangement 8 forms a functional unit on whose outer circumference two clamp-like mounting brackets 56 and 58 can be arranged, each comprising a circular recess, with said recesses corresponding to the external diameters of the motor 6 and of the gear arrangement 8. At an eccentric position the two mounting brackets 56 and 58 each comprise a recess for receiving photoelectric barriers 60 and 62 as limit switching devices that may, for example, be bonded in those locations in the mounting brackets 56 and 58. The mounting brackets 56 and 58 may, for example, in each case be screwed to, or clamped to, the motor 6 or the gear arrangement 8 with the use of a grub screw.

The gear arrangement 8 is to be attached to a plate 14, for example with a screw-type connection. In its housing the gear arrangement 8 comprises a ring-shaped shoulder 64 that can be inserted into the circular opening 66 so as to be flush, and that centers the gear arrangement 8 relative to the plate 14.

The shaft 30 of the gear arrangement 8, which shaft 30 projects through the opening 66, can be connected to a first bushing 32, for example by a laterally inserted grub screw that in a non-positive manner clamps the bushing 32 to the gear shaft 30. A second bushing bush 36 with a projection 38 can be inserted into a slot 34 incorporated in the first bushing 32, so that consequently transmission of torque can take place, and at the same time a certain angular offset as well as an offset across the movement axis 26 can be compensated for.

By a shoulder 63 the spindle 40 driven by the second bushing 36 is rotatably held, by way of sliding discs 65 which are made, for example from bronze, relative to the linear guide 18, and in that place can be made to engage a spindle nut 68 that can be positioned in a recess 70 of the adjustment body 42. For receiving the sliding discs 65, both the linear guide 18 and the gear arrangement housing 16 comprise correspondingly formed recesses 67 or shoulders. The bearing clearance of the spindle 40 can be set with compensating plates 69 that are individually adjustable by grinding or by other materials removing processes, which compensating plates 69 comprise a slot 71 through which they can easily be inserted from the outside and fastened in a partially undone screw connection between the linear guide 18 and the gear arrangement housing 16. Furthermore, it is particularly advantageous if the spindle nut 68 is designed so that it can be slid into the recess 70, because in this position easy exchange of a spindle nut 68 can be achieved, without there being a need to manufacture the adjustment body 42 anew. In order to achieve a particularly play-free longitudinal movement of the adjustment body 42 it may make sense to design the spindle 40 as a recirculating ball screw.

At its side facing away from the motor 6 and from the gear arrangement 8 the adjustment body 42 comprises two outwardly open slot-shaped recesses 72 that are arranged so as to be symmetrical to the movement axis 26 of the apparatus 2, and that are designed to receive a lever 74 and to hingeably hold it. The adjustment lever 74 in turn is designed in such a manner that by its side facing away from the positioning body 42 it can be placed into a control surface mount 22, which is held by an angle mount 20 of the linear guide 18 so as to be hingeable on a hinge axis 48. In order to establish a hingeable connection, cylinder pins, bolts, screws or the like can be used.

Furthermore, on the adjustment body 42 a disrupting profile 24 is arranged, for example by way of a screw-type connection, so that when the adjustment body 42 moves the disrupting profile 24 also moves parallel to the movement axis 26 of the apparatus 2. A disrupting 76 may be arranged in an outwardly open slot 78 of the disrupting profile 24 so that interruption of the photoelectric barrier 60 can take place. For operation of the photoelectric barrier 62 the disrupting profile 24 can comprise a similar device; as an alternative to this, operation of the photoelectric barrier 62 can take place in an inverse manner so that reaching an extreme position is detected only when the disrupting profile 24 leaves the photoelectric barrier 62.

At the same time the disrupting profile 24 is designed, by means of a linear positioning encoder 80, which can be connected to the linear guide 18 by way of a mounting bracket 82, which comprises for example an angular design, to acquire the distance covered by the adjustment body 42 and thus by the disrupting profile 24. Such acquisition takes place, for example, optically in a non-contacting manner. For this purpose the disrupting profile 24 can comprise a reference measuring tape with an optically acquirable gradation, which measuring tape may, for example, be bonded to the side of the disrupting profile 24, which side faces the linear positioning encoder 80. In order to transmit movement of the adjustment body 42 to the control unit 28, a reference point transmitter 78 can be used which may be bonded to the top of the disrupting profile 24 and which transmits position data to a corresponding receiving unit of the control unit 28.

Figure 4:
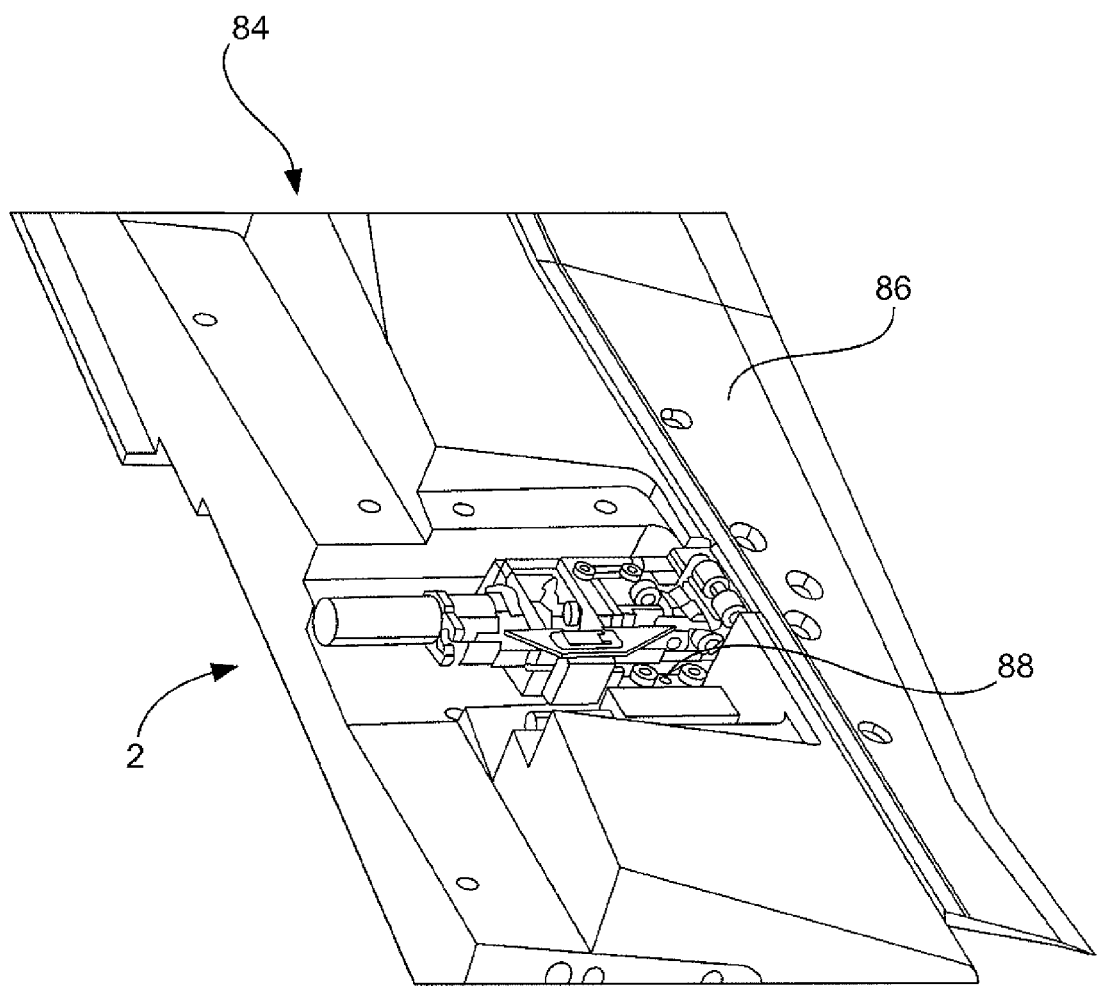
FIG. 4 shows an apparatus, which apparatus has been integrated in an aircraft model.

FIG. 4 shows an apparatus 2, which apparatus 2 is integrated in a wing 84 of an aircraft model and is connected to a control surface 86. Attachment of the apparatus can take place by way of a screw-type connection by means of flanges 88.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Moreover, while at least one exemplary embodiment has been presented in the foregoing summary and detailed description, it should be appreciated that a vast number of variations exist.

It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A control surface unit in a wind tunnel aircraft model with an apparatus for adjusting and locking a movable control surface, comprising:
   at least one adjustment body connected to a control surface mount, the at least one adjustment body including a disrupting profile that has a longitudinal axis that extends substantially parallel to a movement axis and a slot that extends along the longitudinal axis;
   a disrupting arranged in the slot of the disrupting profile;
   two photoelectric barriers spaced apart from each other, with a connecting line for the two photoelectric barriers extending parallel to the movement axis and the disrupting of the disrupting profile interrupts one of the photoelectric barriers during movement of the at least one adjustment body;
   at least one linear guide that is configured to slidably guide the at least one adjustment body along the movement access;
   at least one rotatably held self-locking spindle connected to the at least one adjustment body and configured to move the at least one adjustment body along the movement axis;
   at least one drive unit directly connected to the at least one rotatably held self-locking spindle;
   at least one linear positioning encoder coupled to the at least one linear guide that measures the movement of the disrupting profile; and
   a control unit connected to the at least one linear positioning encoder and the at least one drive unit, the control unit is configured to adjust a predetermined actuating position of the at least one adjustment body by rotation of the at least rotatably held self-locking spindle with the at least one drive unit and by comparing an actual position, detected by the at least one linear positioning encoder, of the at least one adjustment body with the predetermined actuating position,
   wherein the at least one drive unit is arranged on the same axis as the at least one spindle.

2. The apparatus of claim 1, wherein the at least one adjustment body comprises a spindle nut with a spindle nut thread that corresponds to a spindle thread of the spindle and comprises a recess that is configured to receive the spindle nut in a positive-locking and non-rotational manner by sliding in.

3. The apparatus of claim 1, wherein the at least one adjustment body comprises a connection configured to connect to an adjustment lever.

4. The apparatus of claim 1, wherein the at least one linear guide is a body with a movement-axis-symmetrical recess that is configured to guide the at least one adjustment body.

5. The apparatus of claim 1, wherein the at least one adjustment body is coupled to a limit switching device that is connected to the control unit, the limit switching device is configured, when an extreme position of the at least one adjustment body is detected, to avoid an adjustment movement direction that would result in exceeding a corresponding extreme position by inhibiting movement in the adjustment movement direction.

\* \* \* \* \*